Fig. 6.

United States Patent Office 2,711,568
Patented June 28, 1955

2,711,568

PERMANENT MOLD APPARATUS FOR CASTING HOLLOW ARTICLES

Frederick B. Palmer, Dale A. Brown, Lester L. Pond, and William R. Hinz, South Haven, Mich., assignors to Bohn Aluminum & Brass Corporation, Detroit, Mich., a corporation of Michigan Application September 7, 1951, Serial No. 245,528

2 Claims. (Cl. 22—93)

This invention relates to a semi-automatic casting machine which is particularly adapted for molding hollow articles, such as pistons for use in reciprocating-piston engines.

The invention is an improvement on the machine shown in Patent No. 1,952,200 to Flammang, in which two metal mold halves are opened and closed by hydraulic cylinders, and in which the multi-part core includes a center-core assembly raised and lowered by a hydraulic cylinder, and two side cores moved by hand levers.

In order to form the piston with openings for the wrist pins a core pin extends inwardly from each mold half into engagement with a face of a side core. A particular feature of the present invention resides in the provision of a spring resiliently pressing the core pin into engagement with the side core. This resilient pressure insures a snug engagement of the end of the core pin with the side core and prevents the formation of any flashing between these surfaces.

The mechanism for operating the side cores includes a side-core arm attached to each side core, and a side-core bumper bar which is reciprocated by a hand lever. These parts are guided and positioned by upper and lower core rings. To provide for easy removal of the side cores without disturbing any of the adjustments, the invention provides a quick detachable connection of the side-core bumper bar to the side-core arm, the connection being located between the upper and lower core rings.

The machine includes a pair of molds mounted on a turntable for oscillation about a pedestal. Another feature of the invention involves an improved mechanism for oscillating the turntable on the pedestal.

Some parts of the machine are operated manually, others are operated by power devices. In order to obtain rapid operation and proper sequencing, the invention provides electric circuits, some of which include interval timers, for controlling operation of the power devices. Action of the electric circuits is initiated by means of manual switches, so that the operator has complete control of the machine and can keep it in step with his pouring operations.

Another feature of novelty is found in a new core-handling mechanism. This mechanism provides for withdrawal downwardly from the mold, not only of the center-core assembly, but also of one of the side cores, leaving only a single side core within the casting. This arrangement permits use of the machine to mold pistons in which only a small passage remains for removal of core parts. The center-core assembly and the withdrawn side core are maintained in accurate relation to each other and to the mold by means of a horizontally-sliding carriage which moves and guides these parts.

Figure 1:
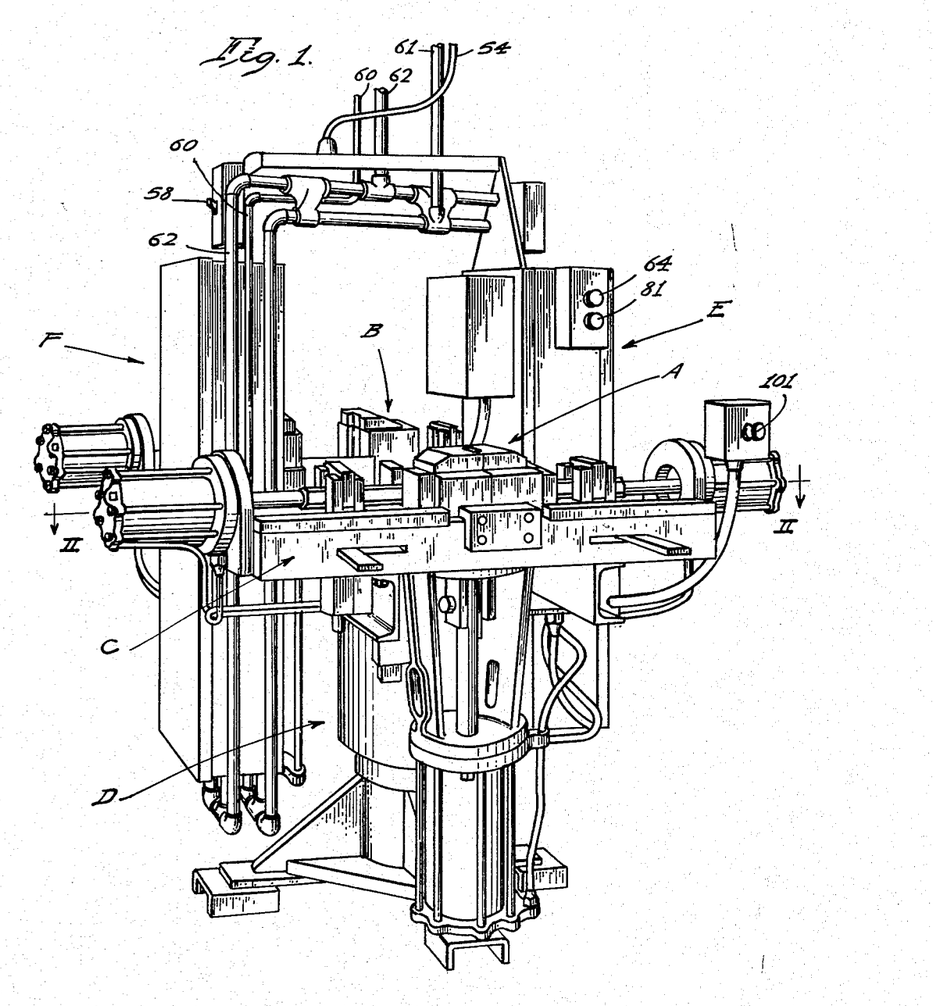
Fig. 1 is a perspective view of one embodiment of the invention.
Figure 2:
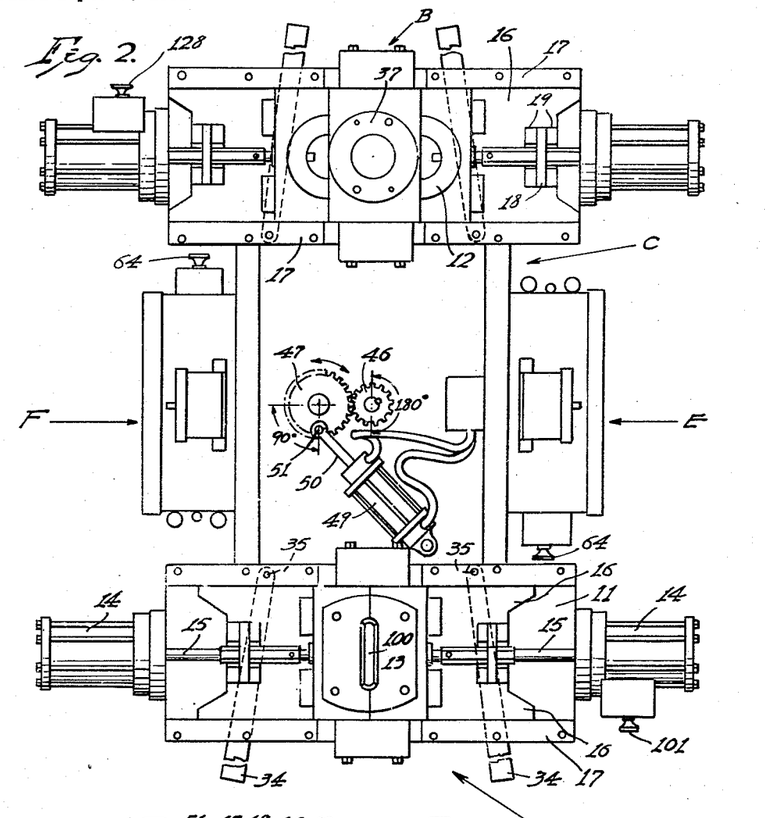
Fig. 2 is a diagrammatic plan view of the machine of Fig. 1.

Referring especially to Figs. 1 and 2, the machine includes two molds A and B mounted on a turntable C which is rotatable on pedestal D and which oscillates back and forth through 180° to bring first one mold and then the other to the front position. The machine is attended by a single operator who stands in front of the machine as viewed in Figs. 1 and 2, and this position may therefore be called the operator's station.

INDIVIDUAL MOLDS

Each of the molds A and B consists essentially of two mold halves which determine the exterior shape of the castings and a multi-part core which determines the shape of the hollow cavity in the casting. Each mold half is operated by a horizontal hydraulic cylinder and the center-core assembly is moved vertically by a vertical hydraulic cylinder. The two side cores are moved by manually operated handles. A control box E contains controls for mold A and a control box F contains controls for mold B. All of these parts are indicated generally in Figs. 1 and 2.

The channel beams 10 which form part turntable C carry the bed-plate 11 on which the individual molds and the mold-operating mechanism is mounted.

The two molds A and B are formed of identical parts which will now be described in detail with special reference to Fig. 4.

Each of the mold halves 12 is semi-cylindrical in shape so that when these two halves are in contact with each other they form a cylindrical mold cavity. A mold cap 13 is attached to each mold half to close the top of the mold when the mold is assembled. Each of the mold halves is moved toward and away from the mold assembly by a horizontal hydraulic cylinder 14 operating through a piston rod 15. Each mold half is mounted on a slide block 16 which is accurately guided by adjustable guide rails 17. The slide block is caused to reciprocate with the piston rod 15 by means of push-pull key 18 which fits between upstanding lugs 19 mounted on the slide block, and which engages between adjustable stop nuts 20 screwed to an extension 21 of piston rod 15.

In order to form the openings for the piston pin in the piston casting a core pin 22 extends inwardly from each mold half into the mold cavity. Each core pin 22 slides in a core pin bushing 23 secured to the mold half, and is connected to a piston rod 15 by a core pin connector 24 which is threaded to the forward end of the extension 21 of the piston rod. The forward end of the core pin connector is formed with a cylindrical bore in which the core pin is slideably mounted and a connector pin 25 is fixed to the core pin but is slidable in slots in the core pin connector. A connector spring 26 resiliently biases the core pin away from the piston rod 15.

Figure 4:
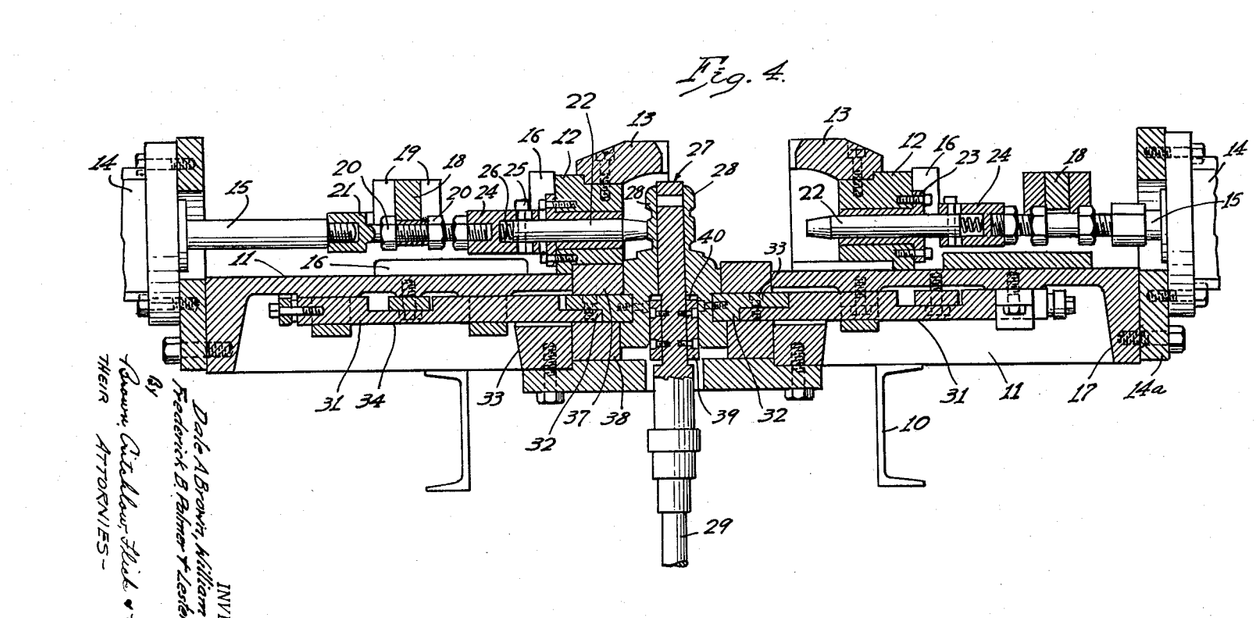
Fig. 4 is a cross section through one of the molds and its operating mechanism.

It will be apparent that the spring-biased lost motion connection provided by core pin connector 24 and spring 26 resiliently presses the core pin against the side core when the parts are assembled as on the left hand side of Fig. 4, so as to maintain a close and intimate contact between the inner end of the core pin and the corresponding flat face on the side core. This resilient contact compensates for wear and avoids the formation of flashing between these surfaces. When the mold half moves away from the center-core assembly, as shown on the right hand of Fig. 4, the spring 26 presses the core pin outwardly so that it projects farther toward the center than it does in the left hand of Fig. 4.

As previously explained, the shape of the interior cavity of the hollow piston casting is determined by the core parts, which include the center-core assembly 27 and the side cores 28. The center-core assembly 27, which will be described in greater detail subsequently, is reciprocated vertically by piston rod 29 operated by hydraulic cylinder 30. At a certain time in the cycle of the machine piston rod 29 is moved downwardly to pull the center-core assembly 27 down from the position of Fig. 4 to a position in which the upper edge of the center-core assembly is below the bottom edge of the side cores 28. After the center-core assembly has been moved downwardly to this lower position, the side cores 28 can be collapsed inwardly toward each other to permit the inward projections on the casting to clear the protruding parts of the side cores. The piston casting is then free of the mold and can be removed from the mold.

The mechanism for lateral movement of the side cores includes a side-core bumper bar 31 connected to each side core through a side-core arm 32. The side-core arm is fastened by means of a machine screw or other suitable means to the side-core. An overlapping splice joint secured by a slip pin 33 provides a quick detachable connection between the side-core bumper bar 31 and the side-core arm 32. This detachable connection is located between the upper core-ring 37 and the lower core-ring 38, and therefore cannot become disconnected during operation of the machine. At the same time it provides for easy removal of the side-core for servicing without disturbing any of the adjustments of the core parts.

Each side-core bumper bar 31 may be reciprocated by means of a hand lever 34 which has its inner end pivotally mounted on the bed-plate on a pivot stud 35 (Fig. 2). The intermediate part of each hand lever passes through an elongated slot in bumper bar 31, thus acting as a bumper to move side cores 38 inward, and the free end of the lever projects forwardly of the machine so that it may be conveniently reached by the operator as clearly indicated in Fig. 2.

An upper core-ring 37 and a lower core-ring 38 are secured to the bed-plate on upper and lower sides of the side-core arms 32. These two core-rings are formed with grooves which guide and accurately position the side-core arms 32, and the inner faces of these two core-rings accurately mate with the outer faces of the side-cores 28.

A center-core guide key 39 is bolted to each side of the center core. These guide keys 39 slide in vertical keyways 40 to accurately position and guide the center-core with relation to the two side cores.

ROTATABLE TURNTABLE

Figure 3:
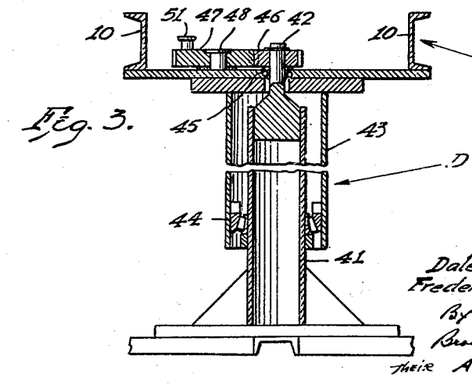
Fig. 3 is a vertical section through the pedestal and bed-plate of the machine of Fig. 1.

As previously explained the turntable C, which carries molds A and B, is rotatably mounted on pedestal D. As shown in detail in Fig. 3 the pedestal includes a tubular support 41 which carries a stud 42 mounted in its upper end. Sleeve 43 depends from turntable C and surrounds tubular support 41. The turntable is rotatably mounted on the tubular support 41 by means of a tapered roller bearing 44 at the lower end of sleeve 43, and by a ball bearing 45 mounted on stud 42.

The mechanism for rotating turntable C includes a spur gear 46 which is keyed to the stud 42 and which mates with gear 47 mounted on stud 48 which is secured to the turntable C. Gear 47 is moved by hydraulic cylinder 49 through piston rod 50, which has its outer end attached to crank pin 51 on gear 47. As illustrated in Fig. 2, the piston rod 50 is in its retracted position. When the piston rod is pushed outwardly it moves crank pin 51 through 90° causing gear 47 to rotate about spur gear 46, thereby oscillating turntable C through 180° so as to move mold A to the rear and mold B to the forward or operator's station.

CONTROL DEVICES

Figure 5:
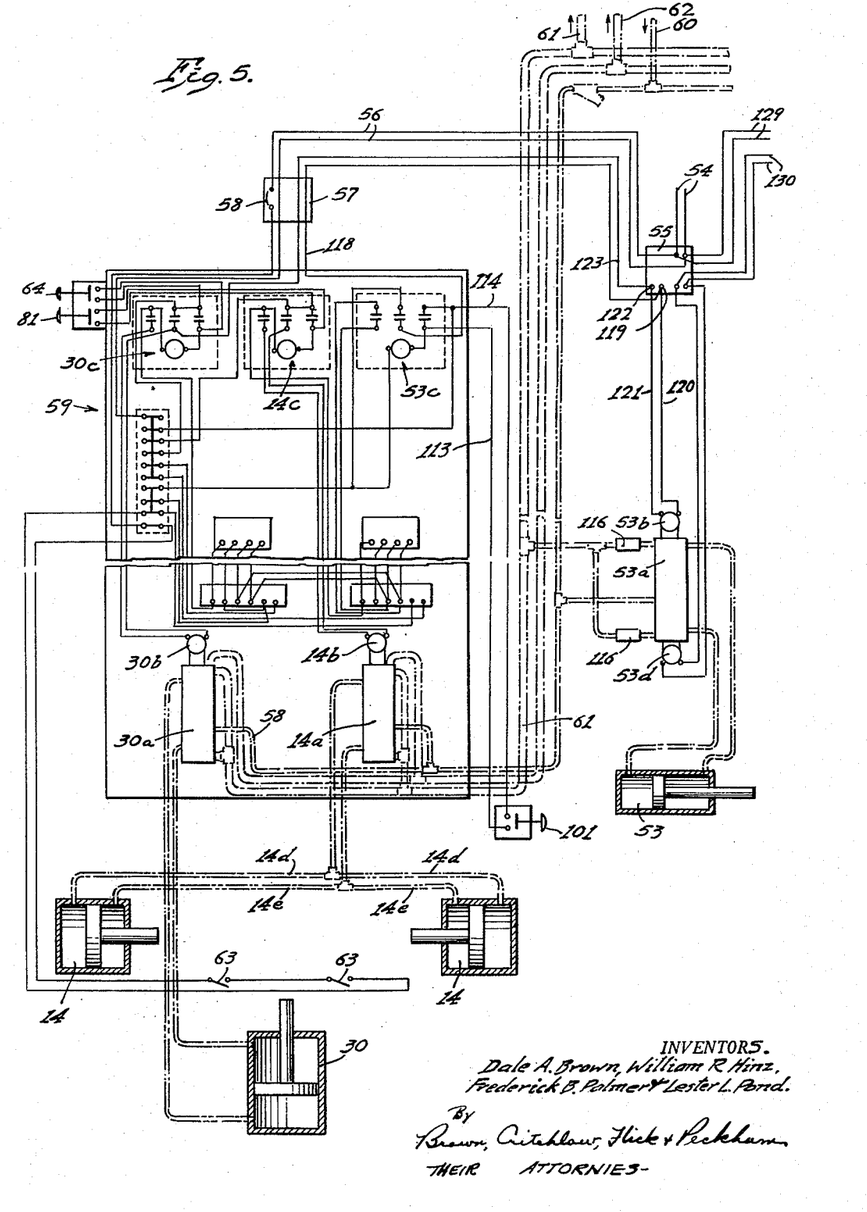
Fig. 5 is a diagram illustrating the electric and hydraulic control mechanism.
Figure 6:
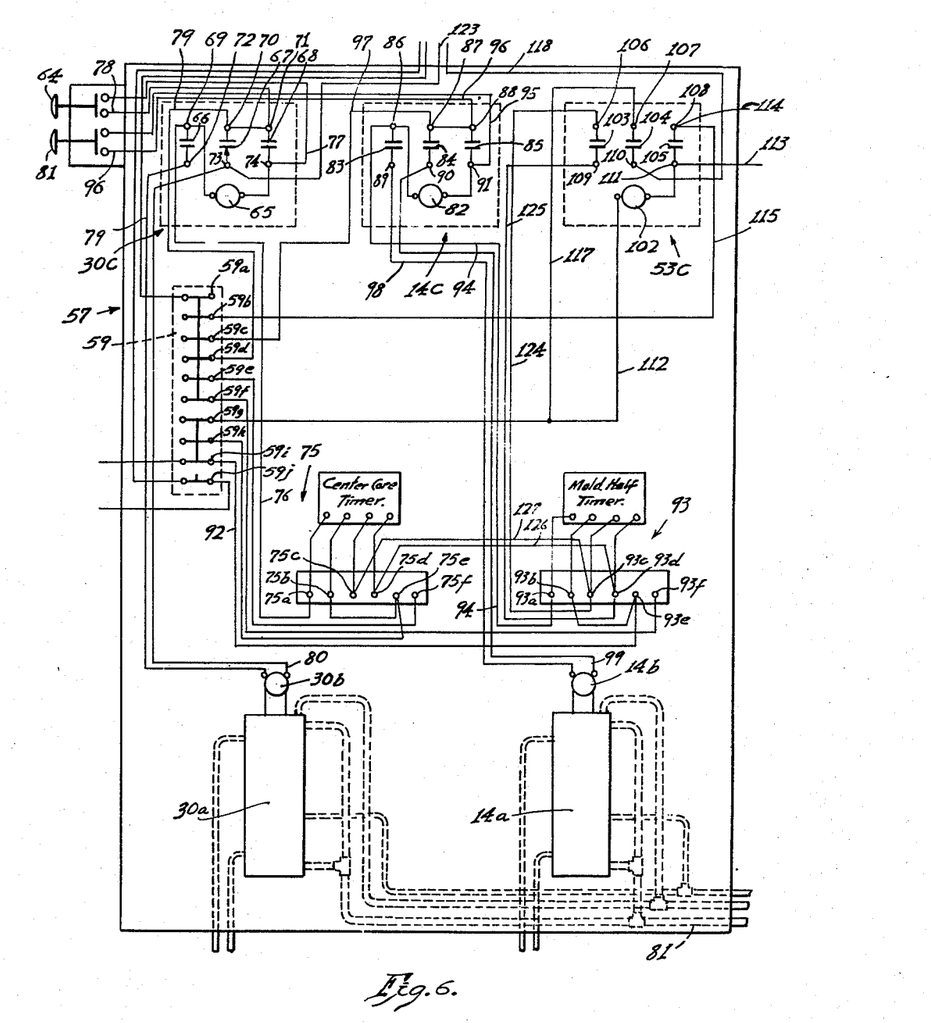
Fig. 6 is an enlarged diagram of the control panel.

It has previously been explained that the table C carries control boxes E and F, each of the control boxes being individual to one of the molds A and B. One of these control boxes, including its wiring diagram and hydraulic connections to the related hydraulic cylinders, is illustrated in Fig. 5. In this figure the center-core hydraulic cylinder 30 is the cylinder for operating vertically the center-core assembly. This center-core cylinder 30 is operated by center-core valve 30a which is under the control of center-core solenoid 30b which is in turn responsive to center-core relay 30c.

Hydraulic cylinders 14 are the cylinders which operate the mold halves and they are controlled by mold-half valve 14a, moved by mold-half solenoid 14b which is under the control of mold-half relay 14c.

Hydraulic cylinder 53 is the rotation cylinder which oscillates turntable C. Cylinder 53 is controlled by valve 53a, moved by solenoid 53b which is under the control of rotation relay 53c.

Electric current is brought to the control panel by conductors 54 which supply the 110 volt supply lines which bring current to contact block 55 from whence conductors 56 carry it to the control box 57 and through manual supply switch 58 to main terminal block 59.

Hydraulic pressure is supplied to the system from the pressure supply line 60. Pressure returns through either pressure line 61 or bleeder line 62.

The detailed construction of the control devices will be more easily understood in connection with a description of their operation. Before explaining this operation in detail, it should be stated in general that after the operator has poured metal into mold A this mold is rotated to the rear of the machine, and after timed cooling periods the mold havles open and the center-core is moved downwardly clear of the mold mechanism. Mold A is in this condition when it is rotated back to the operator's station, and we will start with the mechine in this condition.

The operator first moves the two hand levers 34 inwardly toward each other thus collapsing the two side-cores to a position in which they meet in the center of the mold cavity, leaving the casting standing clear on the table. The operator then takes a pair of tongs and lifts the piston casting upwardly clear of the side cores and deposits it in a box or other container. He is now ready to operate the machine to produce another casting. In doing so he performs the following numbered operations:

I. *Move core handles outwardly*
(Separates side cores)

The operator first moves the core handles 34 outwardly away from each other. This movement of the core handles separates the side cores, preparing them to receive the center-core assembly. This same movement of the core handles 34 also closes the safety switches 63. These safety switches are normally open and both of them must be closed in order to condition the circuits for the next operation. This arrangement ensures that the two side cores are in their outer positions before the center-core assembly starts to move upwardly.

II. *Push top button on control box*
(Moves center-core assembly up into molding position)

The operator now pushes control button 64 which is the top control button on the control box. (See Figs. 1 and 5.) Pushing this button causes energization of center-core solenoid 30b, which moves the center-core valve 30a to a position in which hydraulic pressure from supply line 60 is introduced below the piston of center-core cylinder 30, pushing the center-core assembly upward into molding position.

The electric circuit by which center-core solenoid 30b is energized will now be traced.

This circuit passes through and energizes the center-core relay 30c, which is contained in a box indicated by the broken line. This relay 30c includes an operating solenoid 65, three movable contacts, 66, 67 and 68, three upper terminals 69, 70 and 71, and three lower terminals 72, 73 and 74.

When button 64 is closed a circuit to operate center-core relay 30c is established. In this circuit current flows from terminal 59h of the main terminal block 59 to terminal 75e of the center-core terminal block 75, thence by jumper wire to terminals 75b. An interval timer is connected across terminals 75b and 75a. This interval timer is preferably of a well-known electronic type, is normally closed and may be set to open the current flow after a preselected interval of from 1 to 60 seconds.

After passing through the timer to terminal 75a, current flows through conductor 76 to the terminal 69 of the center-core relay 30c, thence through the operating solenoid 65 which closes the three contacts 66, 67 and 68 and keeps them closed until the solenoid 65 is de-energized.

From the solenoid 65 current flows to the terminal 74 and thence by conductor 77 to the upper terminal of button switch 64. From the lower terminal of switch 64 conductor 78 carries current to terminal 71, whence it flows to terminal 70 and by conductor 79 to terminal 59d of the main terminal block.

As long as the operating solenoid 65 of the center-core relay remains energized, current flows to the center-core solenoid 30b. In this circuit current flows from terminal 69 through contact 66 to the terminal 72; thence by conductor 79 to the center-core solenoid 30b, and returns by conductor 80 to terminal 73, through contact 67 to terminal 70 and by conductor 79 to terminal 59d of the main terminal block. As previously explained, center-core solenoid 30b moves the center-core assembly upward into molding position. As long as solenoid 30b remains energized, the center-core assembly is held upward in molding position.

III. *Push lower button on control box*
(Closes mold halves)

The operator next pushes switch button 81, which is the lower button on the control box. Closing this switch energizes mold-half solenoid 14b which operates hydraulic valve 14a to introduce pressure through lines 14d to the head cavities of the mold-half cylinders 14, causing them to move the mold halves inwardly in closed position. Fluid from the inner cavities of the mold-half cylinders is simultaneously relieved through pipes 14e and valve 14a to hydraulic return line 61.

The current for energizing mold-half solenoid 14b first actuates mold-half relay 14c, which includes an operating solenoid 82; three movable contacts 83, 84 and 85; three upper terminals 86, 87 and 88; and three lower terminals 89, 90 and 91.

When switch button 81 is closed, a circuit to operate mold-half relay 14c is established. In this circuit current flows from terminal 59i of the main terminal block, by conductor 92 to terminal 93e of mold-half terminal block 93, and by jumper wire to terminal 93b. A normally-closed interval timer of the type mentioned above, is connected across terminals 93b and 93a.

After passing through the timer to terminal 93a, the current flows through conductor 94 to terminal 86 of mold-half relay 14c, to the operating solenoid 82, which closes the three movable contacts 83, 84 and 85 and holds them closed until solenoid 82 becomes de-energized.

From the solenoid 82 current flows to terminal 91, and by conductor 95 to the upper contact of switch button 81. From the lower contact of switch button 81 the circuit follows conductor 96 to terminal 88 of mold-half relay 14c, thence by jumper to terminal 87 and via conductor 97 to terminal 59c of the main terminal block.

As long as the operating solenoid 82 of the mold-half relay 14c remains energized current flows through the mold-half solenoid 14b. In this circuit current flows from terminal 86, across contact 83 to terminal 89, and thence by conductor 98 to solenoid 14b, and returns by conductor 99 to terminal 90, through contact 84 to terminal 87 and by conductor 97 to terminal 59c of the main terminal block.

As previously explained, mold-half solenoid 14b causes the mold halves to move inwardly to closed position. As long as solenoid 14b remains energized the mold halves remain closed.

IV. *Pour the casting in mold A*

As the result of the above operations the center-core assembly has been assembled in place and the mold halves have been brought together to form a complete cylinder around the mold cavity. Mold A is now in the fully-closed position of Figs. 1 and 2, and is ready to receive molten metal.

The operator pours the molten metal by hand with a pouring ladle into the pouring opening 100 provided in the pouring caps 13.

V. *Push button on right-hand mold cylinder*

((a) Rotates the frame. (b) Starts interval timers which open mold halves and lower the center-core)

As soon as the mold has been properly filled the operator pushes the button 101. This button is conveniently located on the right-hand mold cylinder where it can be easily pushed by the operator while he still has the ladle in his hand. Closing this switch button 101 operates rotation relay 53c and causes rotation solenoid 53b to operate hydraulic valve 53a to admit pressure from the pressure line 60 to the head cavity of hydraulic cylinder 53, simultaneously relieving pressure from the rear cavity to the return line 61. The resulting outward movement of the piston rotates the frame C through 180° by means of gears 46 and 47 as previously described (see Fig. 2), until the turntable C engages a cushioned stop.

The speed of rotation of the turntable may be varied by changing the setting of adjustable valves 116, which control the rate at which fluid pressure is delivered to hydraulic cylinder 53.

Rotation relay 53c includes an operating solenoid 102; three movable contacts 103, 104 and 105; three upper terminals 106, 107 and 108; and three lower terminals 109, 110, and 111.

When switch button 101 is closed, a circuit to operate rotation relay 53c is established. In this circuit, current flows from terminal 59g of the main terminal block 59, via conductor 112 to operating solenoid 102, which closes the three movable contacts 103, 104 and 105 and holds them closed until solenoid 102 becomes de-energized. From solenoid 102 current flows to terminal 111, by conductor 113 to switch button 101, by conductor 114 to terminal 108, and by conductor 115 to terminal 59b of the main terminal block 59.

During the period when the solenoid 102 of the rotation relay 53c remains energized current flows through the rotation solenoid 53c. In this circuit, current flows from terminal 59g of the main terminal block 59, via conductor 117 to terminal 107 across contact 104 to terminal 110, via conductor 118 to terminal 119 on the terminal block 55, and via conductor 120 to rotation solenoid 53b. Current returns by conductor 121, terminal 122, conductor 123, terminals 73 and 70 of center-core relay 52c, and conductor 79 to terminal 59d of main terminal block 57.

The closing of button switch 101 not only causes rotation of the turntable C in the manner just described, but also starts the timing operation of the interval times for the mold halves and for the center-core. This latter operation will now be described.

When solenoid 102 of the rotation relay 53c closes contact 103, current is supplied to start the timing of the center-core timer and the mold-half timer. This current flows from contact 106 to contact 109, via conductor 125 to contact 93d, to the mold-half timer, return to contact 93c, via conductor 124 to contact 106. Current to the center-core timer flows from terminal 93d, via jumper wire 126 to terminal 75d, to the center-core timer, return to terminal 75c, via jumper wire 127 to terminal 93c.

In a preferred cycle of operation the center-core timer is set for 20 seconds, and the mold-half timer is set for 23 seconds. These times are long enough to permit the metal to solidify before the mold parts move.

After the table C has turned 180° carrying mold A to the rear position, the center-core timer times out, opening a switch in the circuit through the operating solenoid 65 of the center-core relay 30c. When solenoid 65 becomes de-energized the contacts 66, 67 and 68 open, de-energizing center-core solenoid 30b. When center-core solenoid 30b becomes de-energized a return spring moves the center-core valve 30a to its return position, causing center-core cylinder 30 to move the center-core down out of the mold.

De-energization of solenoid 65, by opening contact 67, also breaks the circuit through rotation solenoid 53b and permits rotation valve 53a to be reversed when rotation solenoid 53d is subsequently energized.

When the mold-half timer times out, the operating solenoid 82 of the mold-half relay 14c becomes de-energized, causing mold-half solenoid 14b to de-energize and permitting a return spring to move the mold-half valve 14a to its return position, in which hydraulic flow to the mold-half cylinders is reversed. The mold halves are thereby moved outwardly, away from the casting, which is left standing on table C.

Mold A is now in the condition it was in at the beginning of the cycle, and is ready to be rotated back to the forward or operator's station.

Meanwhile mold B has been at the operator's station, and the operator has performed on it the operations described above in connection with mold A. When he has finished pouring mold B he pushes the button 128 on the right hand cylinder of mold B. This button corresponds with switch button 101 of mold A, and is connected to return solenoid 53d which causes the machine to rotate, bringing mold A back to the operator's station.

VI. *Move core handles inwardly*
(Moves side cores inwardly, clearing the casting)

Mold A arrives at the molding station with the mold halves open and the center-core assembly in its lower, or withdrawn position.

The operator now moves the core handles inwardly, i. e. toward each other. This movement pushes the side cores together, permitting the operator to remove the casting from the mold. It also opens the switches 63. Mold A is now ready for a repetition of the cycle above described.

The circuits 129 and 130, which extend to the right from the contact block 55, connect to a control panel for mold B, which is substantially identical with that described above. The only difference is that the electrical circuit for the turntable solenoid 53d, which rotates the table in the reverse direction is connected to the rotation relay instead of to the center-core relay.

It will be evident that the control devices above described permit rapid and accurate operation of the molds. But since all operations are initiated by manual controls, the machine always keeps pace with the speed of the operator.

Figure 7:
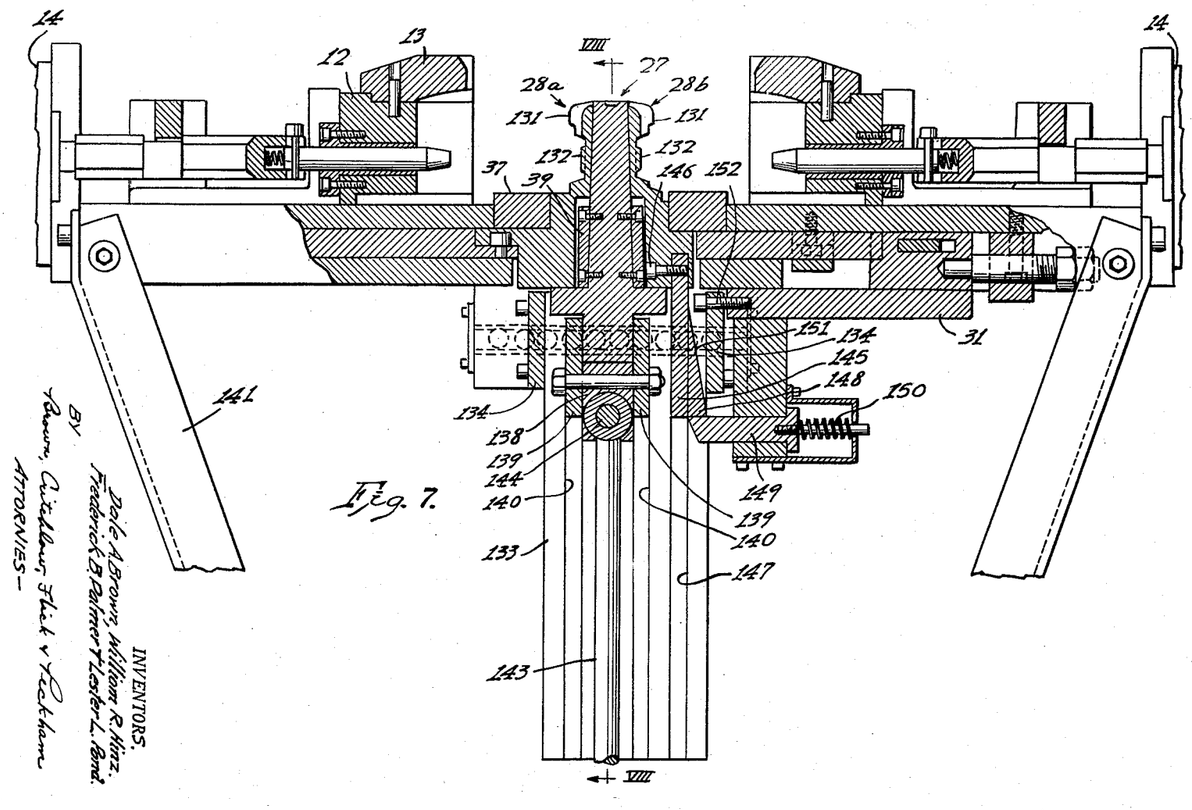
Fig. 7 is a view similar to Fig. 4, but showing a modified mechanism for handling the core parts.
Figure 8:
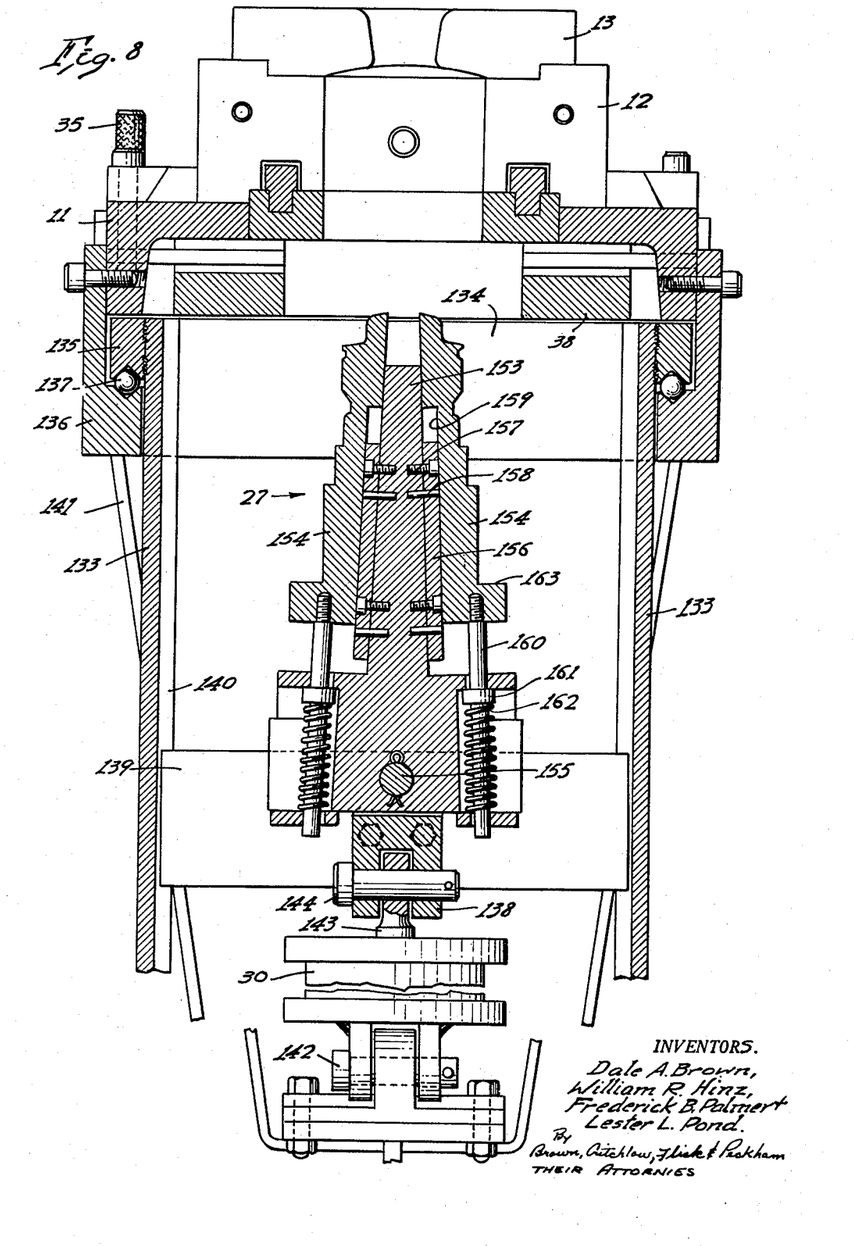
Fig. 8 is a section on line 8—8 of Fig. 7, but with certain operating parts added.

MODIFIED CORE HANDLING MECHANISM
(Modification of Figs. 7 and 8)

It is desired to use the molding machine of the present invention to mold pistons of different types and design. In certain piston designs, the interior distance between the piston bosses is so small that the core handling mechanism above described cannot be used to remove the center-core from the cavity within the piston. This is because even after the center-core has been moved downwardly, and the two side cores have been collapsed into contact with each other, the cavity in the piston is too small to permit the piston to clear the two collapsed side cores. This situation is met by the core handling mechanism disclosed in Figs. 7 and 8.

In Figs. 7 and 8 the mold-halves 12 and their related parts are identical with the form previously described. The center-core assembly 27 may be identical with the center-core assembly used in the embodiment of Fig. 4. The side cores 28a and 28b are also similar to the side cores of Fig. 4, but the enlarged bulbous portion 131 which forms the hollowed out portion of the piston head projects farther outwardly in relation to the flat portion 132 which defines the inner edge of the piston pin boss. It is because of this extra extension of the parts 131 that the piston cannot be removed from the two side cores when they are collapsed together.

This situation is met by first moving the center-core assembly 27 downwardly out of the mold in a manner similar to that used in the embodiment of Fig. 4. The right hand core 28b is then moved inwardly into the space formerly occupied by the center-core assembly, and it also is permitted to move downwardly out of the mold, leaving only the left hand side core 28a in the mold and the piston can readily be removed from this single side core.

In order to permit this lateral shifting of the center-core assembly 27 and the right hand side core 28b, these parts are guided by a sliding carriage which includes two guide plates 133 connected together by cross plates 134. To the upper end of each guide plate 133 is secured a roller track 135 which mates with a corresponding roller track 136 mounted on bed-plate 11. Suitable anti-friction rollers 137 permit sliding movement of the carriage on roller track 136.

The center-core assembly 27 is mounted on center-core cross head 138 which carries slide plates 139. The outer ends of each slide plate 139 engage in vertical grooves 140 formed in the guide plates 133.

Hydraulic cylinder 30, which operates the center-core assembly, is carried by a frame work 141 which depends from the bed-plate 11. In order to provide an articulated connection, the lower end of cylinder 30 is pivotally mounted on frame 141 by pivot pin 142 and the upper end of piston rod 143 is pivoted to the cross head 138 by pivot pin 144.

In order to guide the right hand side core 28b in its vertical movements, a slide plate 145 is secured to the side core 28b by a machine screw 146 or other similar connection. The outer ends of slide plate 145 are guided in grooves 147 formed in the guide plates 133.

To hold the side core 28b up in molding position a detent 148 is secured to the slide plate 145 and is engaged by a latch 149. Latch 149 is normally biased into the path of the detent by a spring 150 and the detent is formed with a sloping cam face 151 which cooperates with the outer beveled face of the latch 149.

In order to permit manual operation of the sliding carriage which guides the center-core assembly and the side core 28b, the inner end of right hand bumper bar 31 is secured by a machine screw 152 or other similar connection to the right hand cross plate 134 of the sliding carriage.

The operation of the core-handling mechanism is as follows:

At the proper time in the sequence of operations, cylinder 30 pulls the center-core assembly downward out of the mold. The operator then moves right hand lever 34 to the left which moves the sliding carriage to the left until the detent 148 has cleared the inner end of the latch 149. When the parts reach this position the right hand side core 28b falls downwardly out of the mold, guided by the guide plates 133. As a result of the guiding action on the slide plate 145 operating in the grooves 147, the side core 28b falls into a position correctly assembled with the center-core assembly 27. The operator now moves the right hand lever 34 back toward the right, sliding the carriage back to its original position. The center-core assembly 27 and the right hand side core 28b are now correctly positioned to assume their proper place in the mold when the center core cross head 138 is moved upwardly by hydraulic cylinder 30.

The operator next moves the left hand lever 34 to the right moving the left hand side core 28a to a central position within the cavity of the casting, where it is in the space originally occupied by the center-core assembly. The casting is now clear of the mold parts and can be removed from the machine.

After the casting has been removed from the machine, the left hand lever 34 is moved back to the left bringing the side core 28a back to its proper position for the next molding operation. When the center-core cross head 138 is moved upwardly at the proper time in the sequence of operations, the center-core assembly 27 and the side core 28b are moved upwardly to their proper positions for producing the next casting.

It will be clear that the core handling mechanism of Figs. 7 and 8 may be used in the machine illustrated in Figs. 1 to 6 inclusive. However, this mechanism can also be used in any suitable mold whether operated individually or in the machine.

Details of the center-core assembly, as shown in Fig. 8 include a center-core 153 and two end cores 154. The center core 153 is secured by slide pin 155 to the cross head 138. To provide for vertical sliding movement of the end cores 154, dove-tailed key wedges 156 are secured to the center core 153 by means of machine screws 157 and positioning pins 158. Each of the end cores 154 is formed with a dove-tailed key slot 159 which closely slides over a dove-tailed key wedge 156.

Each of the end cores 154 is operated by means of an operating pin 160 and spring 162 mounted in the base of the center core 153. A collar 161 on the operating pin 160 limits upward movement of the end core and provides for engagement with spring 162 which biases the end core upwardly.

As the center core assembly is moved upwardly into the mold, a shoulder 163 near the bottom of each end core engages under the bottom of the lower core ring 38. This engagement holds back the end cores while the center core 153 moves upwardly into position in which the upper edge of the center core 153 is flush with the upper surfaces of the end cores 154. The center core assembly is then in proper assembled position for molding.

When the center-core assembly is moved downwardly out of the mold during the first portion of the downward movement of the cross head 138 the springs 162 maintain the end cores pushed upwardly while the center core 153 is pulled downwardly. Because the wedge keys 156 are mounted on tapered sides of the center core 153, this movement causes the two end cores to move inwardly toward each other, thus freeing them from the mold so that continued downward movement of a cross head 138 withdraws the entire center-core assembly from the mold.

The center core is guided and positioned relative to the side cores by the center-core guide keys 39 (Fig. 7) which are similar to the guide keys previously described.

According to the provisions of the patent statutes, we have explained the principle of our invention and have illustrated and described what we now consider to represent its best embodiment. However, we desire to have it understood that, within the scope of the appended claims, the invention may be practiced otherwise than specifically illustrated and described.

We claim:

1. In a casting machine of the type comprising: a pair of separable mold halves which define a mold cavity; a core which defines the interior opening of a casting, the core including a center-core assembly and two side cores, the center-core assembly being movable downwardly out of the mold cavity; the improvement which comprises: a carriage slidable horizontally, guideways on the carriage for guiding vertical movement of the center-core assembly as it is moved downwardly out of the mold cavity; a first side core mounted on the carriage for vertical movement relative to the carriage, a latch adapted to hold the first side core up in the mold; means to slide the carriage horizontally to disengage the first side core from the latch and to move the first side core into the space originally occupied by the center-core assembly, thereby permitting the first side core to fall by gravity out of the mold, guideways on the carriage for maintaining the first side core in proper horizontal relation to the center-core assembly; and means to move the second side core horizontally into the space originally occupied by the center-core assembly.

2. A permanent mold for molding pistons which comprises: a pair of separable mold halves which define the exterior of the piston, a core including a center core and side cores, said core defining the hollow interior of the piston, a core pin extending through each mold half and projecting inwardly so as to contact the side core when the mold is closed, each mold half and core pin assembly being moved from mold-open to mold-closed position by a piston rod, the piston rod having a lost-motion connection with lugs attached to the mold half, the inner end of the piston rod carrying a core pin connector which has a bore which closely receives the outer end of the core pin, the core pin having a lost-motion connection with the core pin connector, and a spring located within the core pin connector and biasing the core pin away from the piston rod.

References Cited in the file of this patent

UNITED STATES PATENTS

| Number | Name | Date |
|---|---|---|
| 666,075 | Vernon | Jan. 15, 1901 |
| 2,070,649 | Cox et al. | Feb. 17, 1937 |
| 2,204,407 | Flammang et al. | June 11, 1940 |
| 2,363,759 | Waldie | Nov. 28, 1944 |
| 2,527,537 | Fahlman et al. | Oct. 31, 1950 |
| 2,532,256 | Holmes et al. | Nov. 28, 1950 |
| 2,567,649 | Morin | Sept. 11, 1951 |
| 2,581,418 | Kohl | Jan. 8, 1952 |
| 2,588,898 | Venner et al. | Mar. 11, 1952 |